3,236,822
VULCANIZABLE ELASTOMERIC COMPOSITION COMPRISING NATURAL OR SYNTHETIC RUBBER, SULFUR AND AN ACCELERATOR
Lawrence F. Sonnabend and George B. Sterling, Midland, Mich., assignors to The Dow Chemical Company, Midland, Mich., a corporation of Delaware
No Drawing. Filed Mar. 5, 1962, Ser. No. 177,241
9 Claims. (Cl. 260—79.5)

This invention relates to certain new vulcanization accelerators and to their use in the manufacture of articles of vulcanizable elastomers.

According to the invention, a vulcanizable elastomeric composition is vulcanized in the presence of a material corresponding to the formula

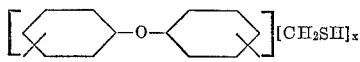

wherein X has a numerical value of from 1 to about 4.

Such mercapatans are readily prepared from the product of the halomethylation of diphenyl oxide by reaction of the said product with an alkali metal sulfhydrate. The reaction involving the exchange of the sulfhydryl group for the halogen of the halomethylated diphenyl oxide is essentially quantitative. However, the halomethylation of the diphenyl oxide does not readily proceed past the point of the introduction of four halomethyl groups into a molecule of the diphenyl oxide. Accordingly, the number of mercaptomethyl groups in a molecule of the vulcanization accelerator is not generally in excess of four. Furthermore, since the halomethylation reaction ordinarily gives rise to a mixture of products containing from one to four halomethyl groups, the value of X in the above formula will be intermediate between 1 and 4, it being impractically difficult and unnecessary to separate the various components resulting from the halomethylation reaction or from the reaction of the mixture of halomethylated compounds with the alkali metal sulfhydrate.

The vulcanization accelerator compositions of the present invention may be used to vulcanize natural and vulcanizable synthetic rubbers which are susceptible to curing when heated with sulfur. They will generally be employed in amounts of from about 0.5 to about 5 percent, based on the weight of the rubber. The vulcanizable composition may, and generally will, contain other compounding ingredients such as fillers, antioxidants, retarders, anti-scorch agents, softeners, pigments and the like.

The elastomeric vulcanizates resulting from the use of the accelerator compositions of the present invention are, in general, characterized by their relatively high elongation.

The invention is illustrated by the following non-limiting examples, showing the preparation of the accelerator compositions and the mode of their employment, in which all parts and percentages are given on a weight basis.

EXAMPLE 1

Into a reaction flask fitted with a condenser, thermometer and stirring means there was charged a mixture of 525 parts of sodium sulfhydrate and 900 parts of methanol. To this charge there was added, with stirring, during a period of about 3 hours, 589 parts of 4,4'-di(chloromethyl) diphenyl oxide. During addition the temperature was maintained at approximately 30° C. The ethanol was then substantially removed by distillation at reduced pressure at a temperature of about 50° C. To the reaction mixture there were added 500 parts of toluene. The total mixture was then filtered to remove the by-product sodium chloride and the sodium chloride filter cake was washed twice with 200 parts of toluene. The toluene was removed from the mixture by distillation therefrom at a temperature of 140° C. and a pressure of 20 mm. of mercury. The residual product was a viscous, clear liquid having a sulfur content of 24.4 percent. This value for content of sulfur corresponds to 2 for the value of X in the general formula

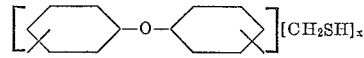

The product, 4,4'-di(mercaptomethyl)diphenyl oxide, is hereinafter referred to as accelerator composition A.

EXAMPLE 2

In a manner comparable to that of Example 1, a number of mercaptomethyl diphenyl oxides were prepared from chloromethylated diphenyl oxides of varying chlorine content. These are listed in Table I, below.

Table I

| Accelerator | Sulfur Content, Percent | Value of X in General Formula |
|---|---|---|
| B | 20.0 | 1.5 |
| C | 26.5 | 2.3 |
| D | 11.9 | a 0.75 |
| E | 20.1 | 1.5 | a Value less than unity since D contained unreacted diphenyl oxide.

EXAMPLE 3

The accelerator compositions above indentified were incorporated into various sulfur-curable elastomeric compounds by conventional milling. The resulting materials were cured and the physical properties of the vulcanizates were determined. The compositions of the mill-blended stocks and physical properties of the vulcanizates are set out in Table II, below, wherein the quantities of the various compounding ingredients are given in parts per 100 parts of elastomer.

Table II

| Elastomer | Sulfur | Carbon Black | Zinc Oxide | Accelerator | Stearic Acid | Magnesium Oxide | Phenyl α-Naphthyl Amine | Cure | Tensile, p.s.i. | Elongation, percent |
|---|---|---|---|---|---|---|---|---|---|---|
| Ameripol 1703 [a] | 2 | 40 | 5 | D, 1 | | | | 50 min., 292° F | 55 | 1,050 |
| Do | 2 | 40 | 5 | D, 2 | | | | do | 118 | 1,050 |
| Do | 2 | 40 | 5 | D, 3 | | | | do | 245 | 1,000 |
| Do | 2 | 40 | 2 | D, 5 | | | | do | 795 | 1,100 |
| Do | 2 | 40 | 5 | E, 1 | | | | do | 151 | 550 |
| Do | 2 | 40 | 5 | E, 2 | | | | do | 1,141 | 850 |
| Do | 2 | 40 | 5 | E, 3 | | | | do | 1,239 | 800 |
| Do | 2 | 40 | 5 | E, 5 | | | | do | 2,215 | 770 |
| Do | 2 | 40 | 5 | C, 2 | | | | do | 1,473 | 590 |
| Do | 2 | 40 | 5 | C, 3 | | | | do | 2,090 | 520 |
| Natural Rubber, Smoked Sheet | 2.7 | 40 | 5 | | 2 | | | 30 min., 287° F | 155 | 790 |
| Do | 2.7 | 40 | 5 | B, 0.5 | 2 | | | do | 915 | 560 |
| Do | 2.7 | 40 | 5 | B, 1.0 | 2 | | | do | 1,320 | 500 |
| Do | 2.7 | 40 | 5 | B, 2.0 | 2 | | | do | 836 | 490 |
| Paracril BJ [b] | 2 | 40 | 5 | | 1 | | | 45 min., 287° F | 117 | 600 |
| Do | 2 | 40 | 5 | B, 0.5 | 1 | | | do | 1,290 | 670 |
| Do | 2 | 40 | 5 | B, 1.0 | 1 | | | do | 1,890 | 570 |
| Do | 2 | 40 | 5 | B, 2.0 | 1 | | | do | 2,050 | 370 |
| Neoprene | 2 | 30 | 5 | | 1 | 4 | 2 | 40 min., 307° F | 1,580 | 650 |
| Do | 2 | 30 | 5 | A, 1 | 1 | 4 | 2 | do | 2,890 | 600 |
| Do | 2 | 30 | 5 | A, 2 | 1 | 4 | 2 | do | 2,905 | 650 |
| Do | 2 | 30 | 5 | A, 3 | 1 | 4 | 2 | do | 2,718 | 630 |
| Do | 2 | 30 | 5 | C, 1 | 1 | 4 | 2 | do | 3,020 | 650 |
| Do | 2 | 30 | 5 | C, 2 | 1 | 4 | 2 | do | 2,925 | 650 |
| Do | 2 | 30 | 5 | C, 3 | 1 | 4 | 2 | do | 2,770 | 720 |
| Synpol 1703 [c] | 2 | 40 | 5 | Benzothiazyl Disulfide, 3. | 3 | | | 50 min., 292° F | 2,000 | 430 |
| Do | 2 | 40 | 5 | A, 1.0 | | | | do | 1,614 | 840 |
| Do | 2 | 40 | 5 | A, 2.0 | | | | do | 2,322 | 710 |
| Do | 2 | 40 | 5 | A, 3.0 | | | | do | 1,973 | 440 |

[a] Copolymer of 23 parts of styrene and 77 parts of butadiene blended with 25 percent, based on copolymer weight, of naphthenic oils.
[b] Copolymer of 26 parts of acrylonitrile and 74 parts of butadiene.
[c] Copolymer of 22.5 parts of styrene and 77.5 parts of butadiene blended with an equal weight of naphthenic oils.

We claim:
1. A process of accelerating the vulcanization of a vulcanizable elastomeric composition consisting essentially of a rubber from the group consisting of natural rubber, rubbery copolymers of butadiene and styrene, rubbery copolymers of butadiene and acrylonitrile and neoprene, comprising incorporating in said composition, prior to vulcanization, sulfur and a compound of the formula

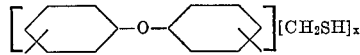

wherein X has an average value of from about 1 to about 4, and vulcanizing said composition.

2. A process of accelerating the vulcanization of a vulcanizable elastomeric composition consisting essentially of a rubber from the group consisting of natural rubber, rubbery copolymers of butadiene and styrene, rubbery copolymers of butadiene and acrylonitrile and neoprene, comprising incorporating in said composition, prior to vulcanization, sulfur and from about 0.5 to about 5 parts per 100 parts of elastomer in the said elastomeric composition of a compound of the formula

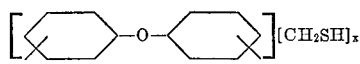

wherein X has an average value of from about 1 to about 4, and vulcanizing said composition.

3. A process according to claim 2 wherein the elastomeric composition comprises natural rubber.
4. A process according to claim 2 wherein the elastomeric composition comprises an elastomeric copolymer of butadiene and styrene.
5. A process according to claim 2 wherein the elastomeric composition comprises an elastomeric copolymer of butadiene and acrylonitrile.
6. A vulcanizable elastomeric composition comprising an elastomer consisting essentially of a rubber from the group consisting of natural rubber, rubbery copolymers of butadiene and styrene, rubbery copolymers of butadiene and acrylonitrile and neoprene, from about 0.5 to about 5 parts per 100 parts of said elastomer of a compound of the formula

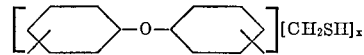

wherein X has an average value of from 1 to about 4, and sulfur.

7. A composition according to claim 6 in which the elastomer is natural rubber.
8. A composition according to claim 6 in which the elastomer is a copolymer of butadiene and styrene.
9. A composition according to claim 6 in which the elastomer is a copolymer of butadiene and acrylonitrile.

References Cited by the Examiner

UNITED STATES PATENTS

| | | | |
|---|---|---|---|
| 2,510,567 | 6/1950 | Flory | 260—79 |
| 2,964,502 | 12/1960 | Wheelock | 260—79 |
| 3,008,916 | 11/1961 | Smith | 260—79.5 |
| 3,041,304 | 6/1962 | Gardner | 260—79.5 |

JOSEPH L. SCHOFER, *Primary Examiner.*

LEON J. BERCOVITZ, *Examiner.*